US006138131A

United States Patent [19]

Alhorn et al.

[11] Patent Number: 6,138,131

[45] Date of Patent: Oct. 24, 2000

[54] ARC-TANGENT CIRCUIT FOR CONTINUOUS LINEAR OUTPUT

[75] Inventors: Dean C. Alhorn, Huntsville; David E. Howard, Hazel Green; Dennis A. Smith, Athens, all of Ala.

[73] Assignee: The United States of America as represented by the Administrator of the National Aeronautics and Space Administration, Washington, D.C.

[21] Appl. No.: 09/208,400

[22] Filed: Nov. 27, 1998

[51] Int. Cl.[7] .................................. G06J 1/00; G06F 7/38; G06G 7/22

[52] U.S. Cl. .................................. 708/4; 708/440; 708/811

[58] Field of Search .................................. 708/4, 8, 276, 708/440, 811, 845; 375/238

[56] References Cited

U.S. PATENT DOCUMENTS

| | | | |
|---|---|---|---|
| 3,737,639 | 6/1973 | Fletcher et al. | 708/811 |
| 4,710,892 | 12/1987 | Fling | 708/440 |
| 4,899,302 | 2/1990 | Nakayama | 708/440 |
| 5,235,535 | 8/1993 | Nakayama | 708/440 |
| 5,648,924 | 7/1997 | Smith | 708/440 |

*Primary Examiner*—Tan V. Mai
*Attorney, Agent, or Firm*—James J. McGroary

[57] ABSTRACT

A device suitable for determining arc-tangent of an angle θ is provided. Circuitry generates a first square wave at a frequency ωt and a second square wave at the frequency ωt but shifted by a phase difference equal to the angle θ. A pulse width modulation signal generator processes the first and second square waves to generate a pulse width modulation signal having a frequency of ωt and having a pulse width that is a function of the phase difference θ. The pulse width modulation signal is converted to a DC voltage that is a linear representation of the phase difference θ.

11 Claims, 4 Drawing Sheets

ARC-TANGENT CIRCUIT FOR CONTINUOUS LINEAR OUTPUT

ORIGIN OF THE INVENTION

The invention was made by employees of the United States Government and may be manufactured and used by or for the Government for governmental purposes without the payment of any royalties.

BACKGROUND OF THE INVENTION

1. Field of the Invention

This invention relates to arc-tangent circuits. More specifically, the invention is an arc-tangent circuit capable of providing a continuous and linear output over 360°.

2. Description of the Related Art

One of the most useful trigonometric functions is the arc-tangent. The arc-tangent is used to determine an angle θ where either the sine and cosine values of the angle are known or where the angle is part of a right triangle in which the magnitudes of adjacent and opposite sides of the triangle (relative to the angle) are known. Specifically, as is well known, the angle θ is equal to either $$\theta = \text{arc-tangent } (\sin(\theta)/\cos(\theta))$$

or $$\theta = \text{arc-tangent}(\text{opposite side}/\text{adjacent side})$$

The arc-tangent function is useful in resolver devices where device output is provided in terms of sine and cosine values of a resolver shaft angle over a shaft rotation of 360°. Thus, the shaft angle can be determined by applying the arc-tangent function to the resolver outputs. However, the arc-tangent function introduces two inherent problems into the determination of resolver shaft angle. First, the arc-tangent function repeats itself every 180°. Second, when the cosine value approaches zero, the arc-tangent approaches infinity.

SUMMARY OF THE INVENTION

Accordingly, it is an object of the present invention to provide an arc-tangent circuit.

Another object of the present invention is to provide an arc-tangent circuit that is continuous over a 360° range of angles.

Still another object of the present invention is to provide an arc-tangent circuit having a linear output.

Yet another object of the present invention is to provide a method of determining the arc-tangent linearly and continuously over a device's 360° of rotation.

Other objects and advantages of the present invention will become more obvious hereinafter in the specification and drawings.

In accordance with the present invention, a device suitable for determining arc-tangent of an angle is provided. A first circuit generates a first square wave at a frequency ωt. A second circuit generates a second square wave at the frequency ωt but shifted by a phase difference θ. A pulse width modulation signal generator coupled to the first and second circuits processes the first and second square waves to generate a pulse width modulation signal having a frequency of ωt and having a pulse width that is a function of the phase difference θ. A converting circuit is coupled to the pulse width modulation signal generator to convert the pulse width modulation signal to a DC voltage that is a linear representation of the phase difference θ.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
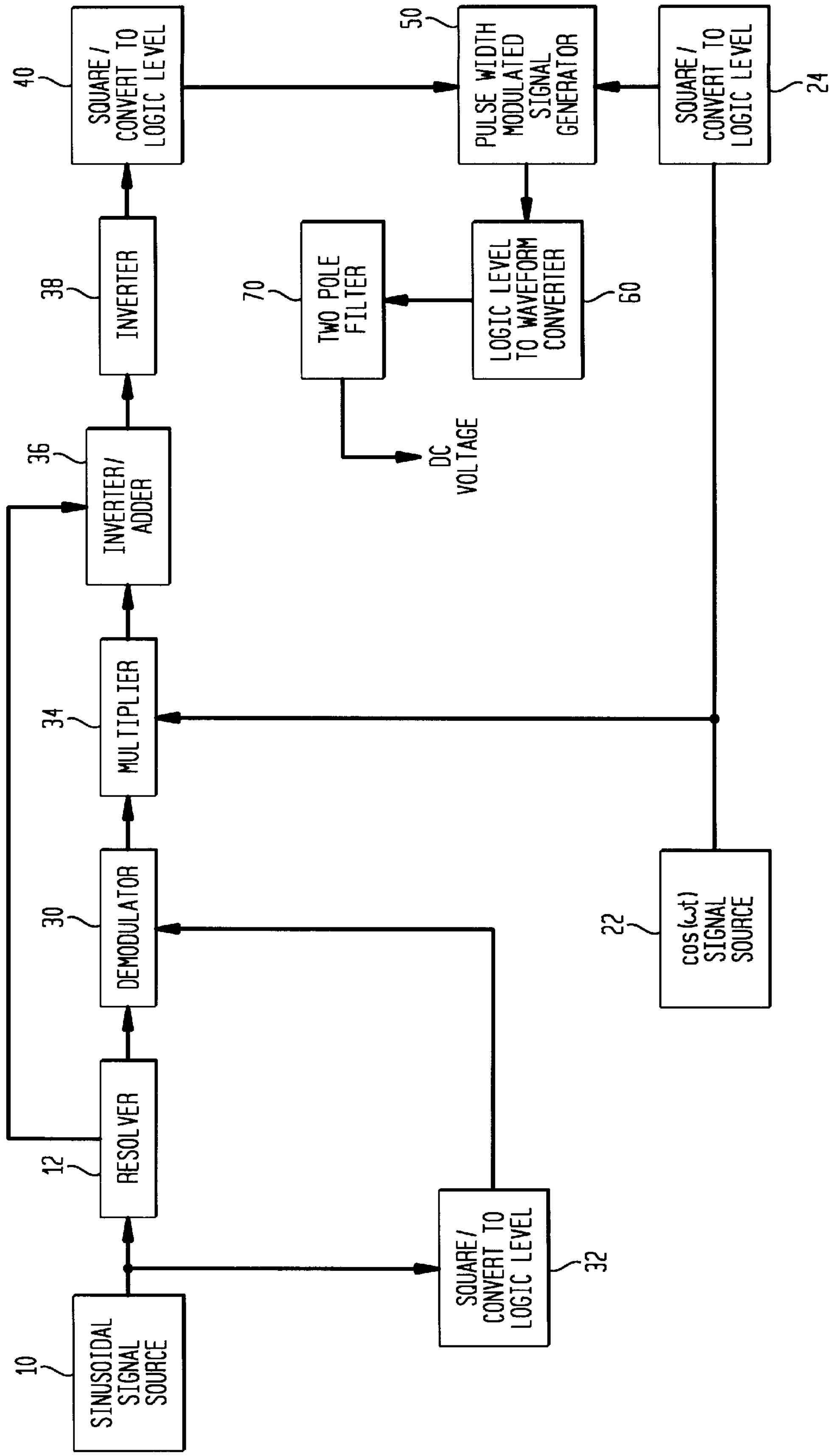
FIG. 1 is a block diagram of one embodiment of the arc-tangent circuit of the present invention as it is used with resolver outputs to produce a continuous and linear output indicative of the resolver's shaft angle.

Referring now to the drawings, and more particularly to FIG. 1, the arc-tangent circuit of the present invention is illustrated in block diagram form and will be described by way of example as it relates to providing a continuous linear output over 360° for a resolver. However, as will be apparent from the following description, the present invention is not limited to use with resolvers. The present invention can also be used to find an angle when known x,y coordinates are available.

Typically, a resolver's outputs are modulated sinusoidal signals where the modulation is caused by a sinusoidal excitation signal. Accordingly, in FIG. 1, a source 10 provides a sinusoidal excitation signal (e.g., sin(ωt)) to drive a resolver 12 where ω is the carrier frequency in radians per second and t is equal to time in seconds. The outputs of resolver 12 related to its shaft angle θ are modulated signals which, in this example, are of the form $$\sin(\omega t)*\sin(\theta)$$

and $$\sin(\omega t)*\cos(\theta)$$

Note that the sin(θ) and cos(θ) terms can also represent the opposite and adjacent sides of a right triangle and are not only indicative of resolver outputs.

The present invention operates by first generating two square waves having the same frequency but shifted in phase by an amount equal to the angle θ. While this can be accomplished in a variety of ways and is dependent somewhat on the form of the modulated signals, one way of generating the two square waves from these outputs of resolver 12 will now be described. To generate the first square wave, a cos(ωt) signal source 22 outputs a cos(ωt) signal having the same magnitude as the sinusoidal excitation signal. The cos(ωt) signal is then squared and converted to a two-state logic level (LL) signal at a square and convert to logic level circuit 24. The output of circuit 24 is the first square wave having a frequency of (ωt) and will be represented herein as LL[cos(ωt)]. The first square wave could also be generated by processing the sinusoidal excitation signal from source 10 through an inverter/integrator combination to convert the sin(ωt) excitation signal to a cos(ωt) signal having the same magnitude as the sin(ωt) excitation signal.

To generate the second square wave shifted in phase by the angle θ, the [sin(ωt)*cos(θ)] output of resolver 12 is first demodulated at a demodulator 30 to produce a signal that is indicative of cos(θ). Demodulator 30 can use a square wave generated from the source's sinusoidal excitation signal. Specifically, the sin(ωt) excitation signal from source 10 can be squared and converted to a two-state logic level at a square and convert to logic level circuit 32, the output of which is represented as LL[sin(ωt)] and is used as an input to demodulator 30.

The cos(θ) signal output from demodulator 30 is passed to a multiplier 34 as is the cos(ωt) signal output from integrator 22. The resulting multiplied signal cos(ωt)*cos(θ) and the second (modulated) output of resolver 12 (or sin (ωt)*sin(θ)) are fed to an inverter and adder circuit 36 which adds the inverse of these two inputs. The output of circuit 36 is $$-[\cos(\omega t)*\cos(\theta)+\sin(\omega t)*\sin(\theta)]$$

and which, by trigonometric identity, is equal to −[cos(ωt−θ)]. Accordingly, when the output of circuit 36 is inverted at inverter 38 and squared/converted to a two-state logic level at a square and convert to logic level circuit 40, the second square wave is created. That is, the output of circuit 40 in a square wave having a frequency of (ωt) but shifted in phase from the first square wave by the angle θ. The second square wave will be represented herein as LL[cos(ωt−θ)].

The two square waves LL[cos(ωt)] and LL[cos(ωt−θ)] are next processed by a circuit 50 which develops a logic level pulse width modulated signal. As is well known in the art, a pulse width modulated signal is defined as the digital encoding of an analog value where the period and pulse height of the signal are constant while the pulse width is proportional to the analog value being represented. In the present invention, the analog value is the shaft angle θ of resolver 12. Thus, circuit 50 generates a pulse width modulated signal having a pulse width that is indicative of shaft angle θ.

Figure 2:
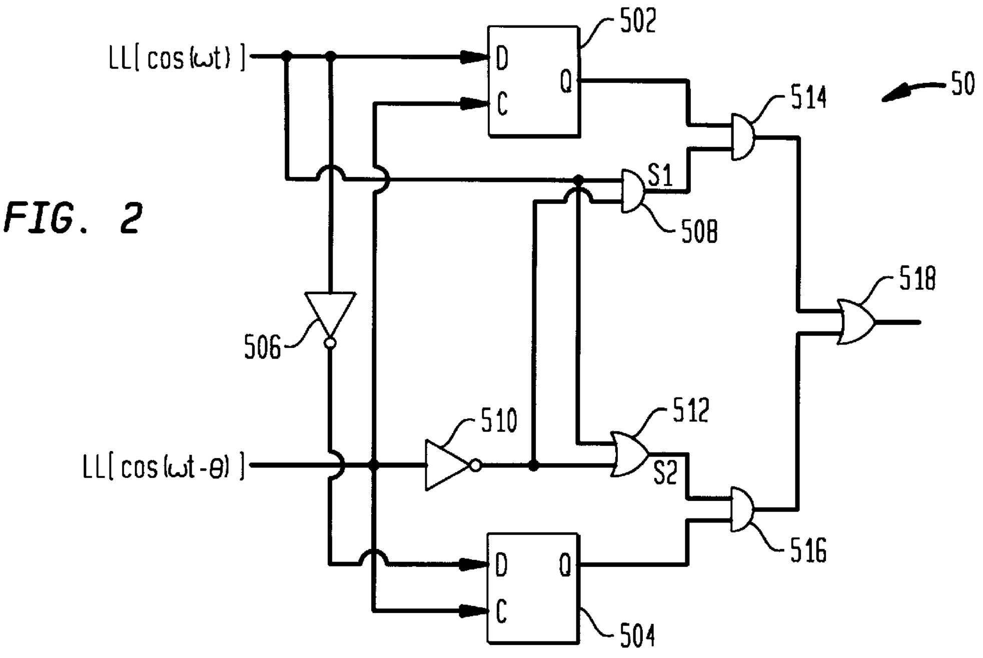
FIG. 2 is a logic circuit diagram of an embodiment of the pulse width modulation signal generator used in the present invention.

Circuit 50 is realized in the present invention as a digital logic circuit, one embodiment thereof being illustrated in FIG. 2 by way of example. Structurally, circuit 50 includes a first D-flip flop 502 and a second D-flip flop 504. The D input of flip flop 502 is coupled to the output of circuit 24 in order to receive the square wave LL[cos(ωt)]. The D input of flip flop 504 receives the inverse of the square wave LL[cos(ωt)] from an inverter 506 coupled to circuit 24. The clock inputs for both flip flops 502 and 504 are coupled to circuit 40 to receive the second square wave LL[cos(ω−θ)]. A first AND circuit 508 has inputs of square wave LL[cos (ωt)] and the inverse of LL[cos(ωt−θ)] generated by an inverter 510. A first OR circuit 512 also has inputs of LL[cos(ωt)] and the inverse of LL[cos(ωt−θ)]. The outputs of flip flop 502 and AND circuit 508 serve as inputs to a second AND circuit 514. The outputs of flip flop 504 and OR circuit 512 serve as inputs to a third AND circuit 516. The outputs of AND circuits 514 and 516 serve as inputs to a second OR circuit 518. Finally, the output of OR circuit 518 is a logic level pulse width modulation signal.

Figure 3:
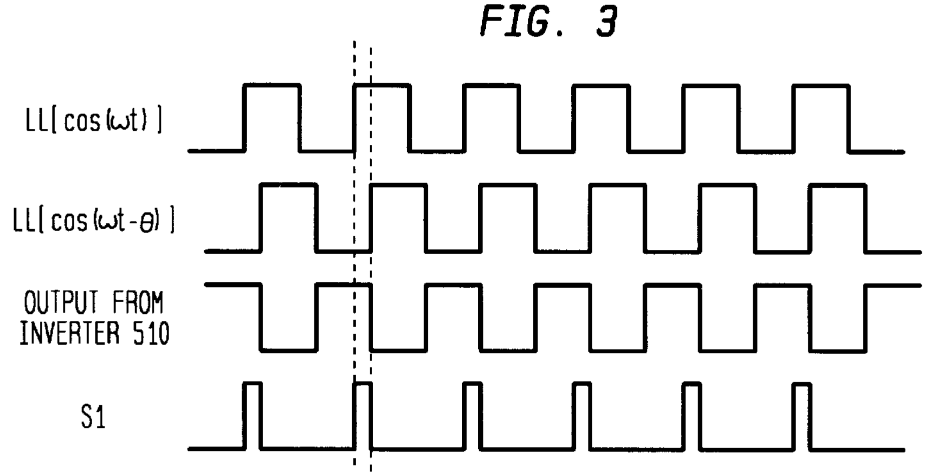
FIG. 3 is a graphic illustration of a first set of exemplary signals processed by and output from the pulse width modulation signal generator.

To better understand the operation of circuit 50, two examples will be explained using the signal diagrams in FIGS. 3 and 4. In FIG. 3, the square wave LL[cos(ωt−θ)] transitions to a logic level high when the square wave LL[cos(ωt)] is logically high. Further, the output of flip flop 502 is latched logically high while the output of flip flop 504 is latched logically low. The low output of flip flop 504 causes a low output from AND circuit 516. The output of flip flop 502 will be logically high when LL[cos(ωt)] transitions to its logically high half-cycle while LL[cos(ωt)] is high. The output of AND circuit 508 is a signal S1 which is logically high only during the time that LL[cos(ωt)] is high and LL[cos(ωt−θ)] is low. In other words, signal S1 is a pulsed wave having the same frequency (ωt) as the two square waves input to circuit 50. Signal S1 will serve as the output of circuit 50 (i.e., the output of OR circuit 518) when flip flop 502 is latched logically high as described above. As is apparent from this example, the pulse width of signal S1 will vary depending on when LL[cos(ωt−θ)] transitions to high during the high half-cycle of LL[cos(ωt)]. In other words, the pulse width of signal S1 is indicative of the angle θ (for angles ranging between 0–180°) since the angle θ determines when LL[cos(ωt−θ)] transitions to high.

Figure 4:
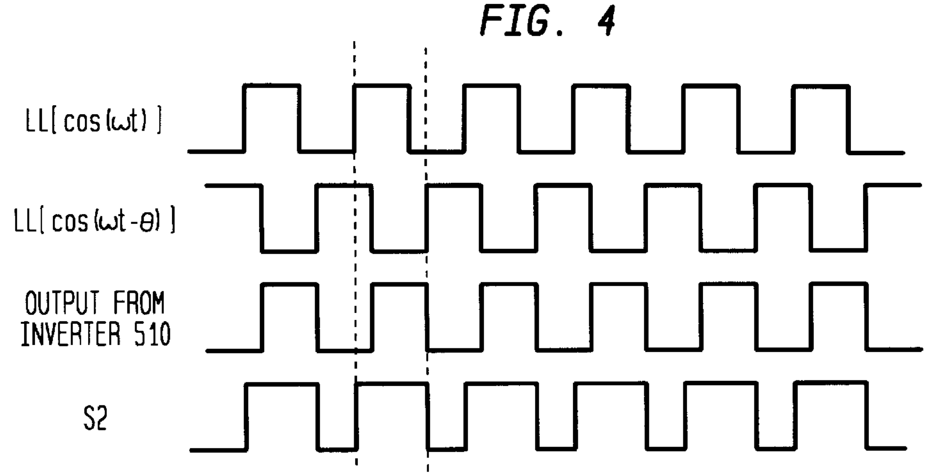
FIG. 4 is a graphic illustration of a second set of exemplary signals processed by and output from the pulse width modulation signal generator.

In the FIG. 4 example, signal S2 is generated that is indicative of the angle θ when θ falls within the other 180° of possible angles of resolver 12. That is, FIG. 4 depicts the example where the square wave LL[cos(ωt−θ)] transitions to logic level high when LL[cos(ωt)] is logically low. When this occurs, the output of flip flop 502 is logically low (causing a low output from AND circuit 514) while the output of flip flop 504 is logically high. The output of flip flop 504 will be latched logically high when LL[cos(ωt−θ)] transitions to its logically high half-cycle while LL[cos(ωt)] is low. The output of OR circuit 512 is a signal S2 which is logically high when LL[cos(ωt)] is high or when the inverse of LL[cos(ωt−θ)] is high. As a result, signal S2 is a pulsed wave having the same frequency ωt but a pulse width that is equal to the pulse width of LL[cos(ωt)] plus additional width based on when LL[cos(ωt−θ)] transitions to logic level high while LL[cos(ωt)] is low. In other words, the pulse width of S2 is indicative of an angle θ ranging from 180–360° since the angle θ again determines when LL[cos (ωt−θ)] transitions to high during the low half-cycle of LL[cos(ωt)].

The output of logic level circuit 50 is logically high to define a pulse width indicative of an angle θ ranging between 0–360° depending on what θ is. The percentage of time the pulse width is logically high can therefore be converted to some value indicative of the angle θ. Referring again to FIG. 1, one such means for converting the logic level output from circuit 50 to a DC voltage is shown. Specifically, the logic level output of circuit 50 is first converted to a pulse width modulated wave form at circuit 60 so that a wave form similar to those illustrated in FIGS. 3 and 4 is generated. The generated waveform is then fed to a two-pole filter circuit 70 which filters out the frequency (ωt) to output just a voltage representation of the angle θ.

Figure 5A:
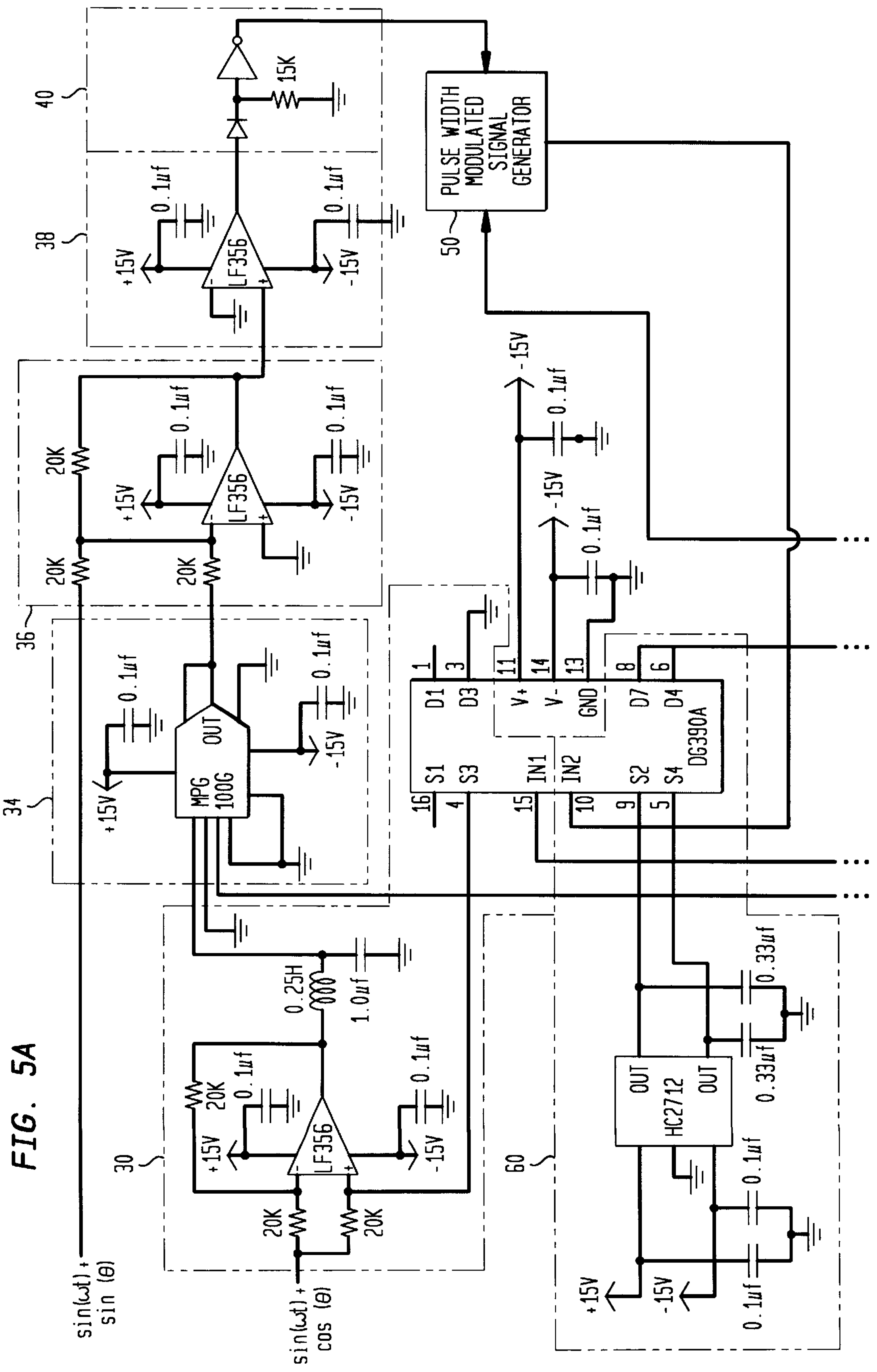
FIGS. 5A–5B, is a schematic diagram illustrative of one possible circuit implementation of the block diagram illustrated in FIG. 1.
Figures 5, 5B:
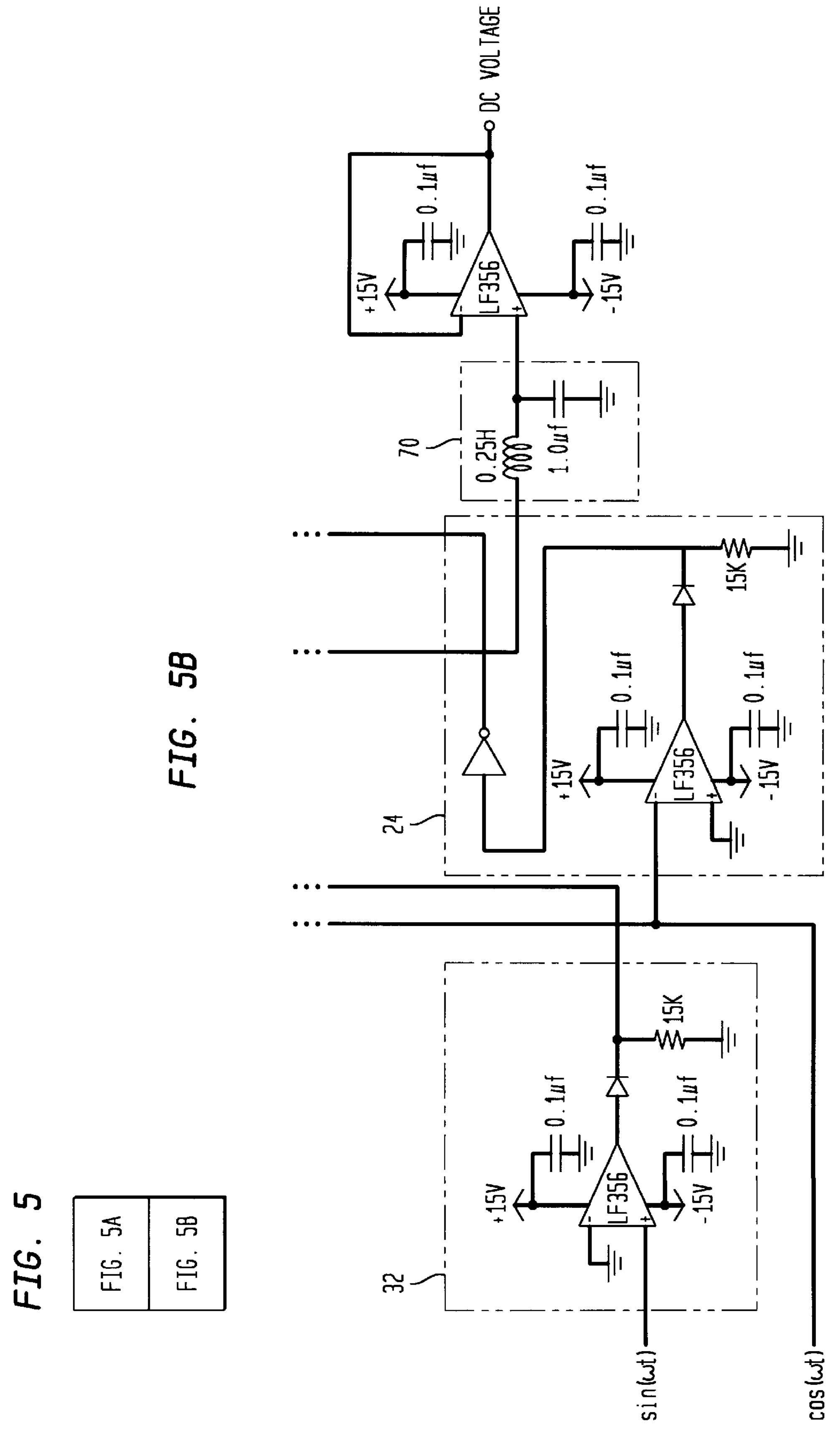
FIG. 5 comprised

One possible circuit implementation of the illustrated example is provided in FIG. 5 where portions of the circuit corresponding to the block in FIG. 1 are appropriately blocked and referenced. The details of circuit 50 are omitted in FIG. 5 since they are illustrated in FIG. 2. The LF356 op amps are available from National Semiconductor Corporation, Santa Clara, Calif.; the MPY100G multiplier is available from Burr Brown Corporation, Tucson, Ariz.; the HC2712 voltage regulator is available from Hycomp, Inc., Marlborough, Mass.; and the DG390A analog switch is available from Siliconix, Santa Clara, Calif.

The advantages of the present invention are numerous. The arc-tangent circuit provides a linear representation of a resolver's shaft angle for any angle from 0–360°. The approach used will never divide by zero and is therefore not subject to this or other inherent problems of arc-tangent circuits.

Although the invention has been described relative to a specific embodiment thereof, there are numerous variations and modifications that will be readily apparent to those skilled in the art in light of the above teachings. For example, the functional blocks in FIG. 1 could be implemented by a variety of equivalent electronic circuits other than those shown by way of example in FIG. 5. Further, the present invention is not limited to the use of cosine-based square wave pairs. That is, the present invention could develop square wave pairs using cos(ωt) and cos(ωt±θ) or sin(ωt) and sin(ωt±θ). In general, the square waves need only be of the same frequency but shifted in phase. Still further, the present invention is not limited to use with a resolver. Indeed, the present invention can function with any device/circuitry that provides the two square waves of identical frequency but shifted in phase with respect to one another. It is therefore to be understood that, within the scope of the appended claims, the invention may be practiced other than as specifically described.

What is claimed as new and desired to be secured by Letters Patent of the United States is:

1. A device comprising:

a first circuit for generating a first square wave at a frequency ωt;

a second circuit for generating a second square wave at said frequency ωt shifted by a phase difference θ;

a pulse width modulation signal generator coupled to said first circuit and said second circuit for processing said first square wave and said second square wave to generate a pulse width modulation signal having a frequency of ωt and having a pulse width that is a function of said phase difference θ; and a converting circuit coupled to said pulse width modulation signal generator for converting said pulse width modulation signal to a DC voltage that is a linear representation of said phase difference θ.

2. A device as in claim 1 wherein said pulse width modulation signal generator is a digital logic circuit.

3. A device as in claim 2 wherein said digital logic circuit comprises:

first logic circuitry coupled to said first circuit and said second circuit for generating said pulse width modulation signal when said first square wave is logically high and said second square wave transitions from being logically low to logically high; and second logic circuitry coupled to said first circuit and said second circuit for generating said pulse width modulation signal when said first square wave is logically high or when said first square wave is logically low and said second square wave transitions from being logically low to logically high.

4. An arc-tangent circuit for determining an angle θ unambiguously from 0–360°, comprising:

signal means for supplying a first modulated signal as a function of sin(θ) and a second modulated signal as a function of cos(θ), wherein said first modulated signal and said second modulated signal are modulated by a sinusoidal carrier wave having a frequency ωt where ω is equal to a carrier frequency in radians per second and t is equal to time in seconds;

circuitry coupled to said signal means for generating a first square wave having a frequency of ωt and a second square wave having said frequency of ωt shifted by a phase difference equal to θ;

a pulse width modulation signal generator coupled to said circuitry for processing said first square wave and said second square wave to generate a pulse width modulated wave having a frequency of ωt and having a pulse width that is a function of said phase difference θ; and a converting circuit coupled to said pulse width modulation signal generator for converting said pulse width modulated wave to a DC voltage that is a linear representation of θ.

5. An arc-tangent circuit as in claim 4 wherein said pulse width modulation signal generator is a digital logic circuit.

6. An arc-tangent circuit as in claim 5 wherein said digital logic circuit comprises:

first logic circuitry coupled to said signal means for generating said pulse width modulated wave when said first square wave is logically high and said second square wave transitions from being logically low to logically high; and second logic circuitry coupled to said signal means for generating said pulse width modulated wave when said first square wave is logically high or when said first square wave is logically low and said second square wave transitions from being logically low to logically high.

7. An arc-tangent circuit for determining a resolver's angle θ unambiguously from 0–360°, comprising:

a source for generating a sinusoidal excitation signal having a frequency of ωt where ω is equal to a carrier frequency in radians per second and t is equal to time in seconds;

a resolver coupled to said source, said resolver driven by said sinusoidal excitation signal to output a first modulated signal as a function of sin(θ) and a second modulated signal as a function of cos(θ), wherein said first modulated signal and said second modulated signal are modulated by said sinusoidal excitation signal;

a first circuit for generating a first square wave having a frequency of ωt;

a second circuit coupled to said source and said resolver for generating a second square wave having a frequency of ωt shifted by a phase difference equal to θ;

a pulse width modulation signal generator coupled to said first circuit and said second circuit for processing said first square wave and said second square wave to generate a pulse width modulated wave having a frequency of ωt and having a pulse width that is a function of a said phase difference θ; and a converting circuit coupled to said pulse width modulation signal generator for converting said pulse width modulated wave to a DC voltage that is a linear representation of said phase difference θ.

8. An arc-tangent circuit as in claim 7 wherein said sinusoidal excitation signal is of the form sin(ωt) and wherein said first circuit comprises:

a second source for generating a cos(ωt) signal having the same magnitude as said sinusoidal excitation signal; and a third circuit coupled to said second source for converting said cos(ωt) signal to said first square wave.

9. An arc-tangent circuit as in claim 8 wherein said second circuit comprises:

a demodulator coupled to said resolver for demodulating said second modulated signal and outputting a cos(θ) signal;

a multiplier coupled to said second source and said demodulator for multiplying said cos(θ) signal times said cos (ωt) signal and outputting a multiplied signal;

a fourth circuit coupled to said resolver and said multiplier for combining said first modulated signal and said multiplied signal in order to output a cos(ωt−θ) signal; and a fifth circuit coupled to said fourth circuit for converting said cos(ωt−θ) signal to said second square wave.

10. An arc-tangent circuit as in claim 7 wherein said pulse width modulation signal generator is a digital logic circuit.

11. An arc-tangent circuit as in claim 10 wherein said digital logic circuit comprises:

first logic circuitry coupled to said first circuit and said second circuit for generating said pulse width modulated wave when said first square wave is logically high and said second square wave transitions from being logically low to logically high; and second logic circuitry coupled to said first circuit and said second circuit for generating said pulse width modulated wave when said first square wave is logically high or when said first square wave is logically low and said second square wave transitions from being logically low to logically high.

* * * * *